US009982817B2

(12) United States Patent
Ochi et al.

(10) Patent No.: US 9,982,817 B2
(45) Date of Patent: May 29, 2018

(54) SEPARATION PREVENTIVE PIPE JOINT AND PIPELINE CONSTITUENT MEMBER

(71) Applicant: Kubota Corporation, Osaka-shi, Osaka (JP)

(72) Inventors: Takatoshi Ochi, Hyogo (JP); Nobumitsu Nishimaki, Hyogo (JP)

(73) Assignee: Kubota Corporation, Osaka-shi, Osaka (JP)

( * ) Notice: Subject to any disclaimer, the term of this patent is extended or adjusted under 35 U.S.C. 154(b) by 0 days. days.

(21) Appl. No.: 15/111,307

(22) PCT Filed: Dec. 2, 2014

(86) PCT No.: PCT/JP2014/081803
§ 371 (c)(1),
(2) Date: Jul. 13, 2016

(87) PCT Pub. No.: WO2015/111303
PCT Pub. Date: Jul. 30, 2015

(65) Prior Publication Data
US 2016/0334035 A1 Nov. 17, 2016

(30) Foreign Application Priority Data
Jan. 27, 2014 (JP) .................. 2014-011938

(51) Int. Cl.
*F16L 21/03* (2006.01)
*F16L 21/00* (2006.01)
(Continued)

(52) U.S. Cl.
CPC ............ *F16L 21/007* (2013.01); *F16L 21/03* (2013.01); *F16L 21/08* (2013.01);
(Continued)

(58) Field of Classification Search
CPC ......... F16L 21/007; F16L 21/03; F16L 21/08; F16L 27/1017; F16L 27/1012; F16L 23/0286; F16L 21/035
See application file for complete search history.

(56) References Cited

U.S. PATENT DOCUMENTS 3,884,510 A * 5/1975 Bram ...................... F16L 27/12
285/286.1
4,194,769 A * 3/1980 Bram ...................... F16L 17/035
285/184

(Continued)

FOREIGN PATENT DOCUMENTS

JP 54-106918 A 8/1979 ............. F16L 21/08
JP 57-165883 U 10/1982
(Continued)

OTHER PUBLICATIONS

International Search Report from corresponding International Patent Application No. PCT/JP2014/081803, dated Mar. 10, 2015.

*Primary Examiner* — David Bochna
*Assistant Examiner* — James A Linford
(74) *Attorney, Agent, or Firm* — Kusner and Jaffe

(57) ABSTRACT

A separation preventive pipe joint having an adjustable angle of deflection. A lock ring storage groove accommodates a metallic lock ring that can be engaged with a spigot protrusion and a cushioning material that comes into contact with a bottom of the lock ring storage groove and a side wall on a socket opening side. The cushioning material is made of a material softer than the lock ring.

4 Claims, 10 Drawing Sheets

(51) Int. Cl.
*F16L 21/08* (2006.01)
*F16L 23/028* (2006.01)
*F16L 27/10* (2006.01)

(52) U.S. Cl.
CPC ....... *F16L 23/0286* (2013.01); *F16L 27/1012* (2013.01); *F16L 27/1017* (2013.01)

(56) References Cited

U.S. PATENT DOCUMENTS

| | | | | |
|---|---|---|---|---|
| 4,296,953 | A * | 10/1981 | Nagao | F16L 21/08 285/302 |
| 4,524,505 | A | 6/1985 | Conner | 29/453 |
| 4,552,385 | A | 11/1985 | Peting | |
| 4,643,466 | A * | 2/1987 | Conner | F16L 21/08 285/321 |
| 4,685,708 | A * | 8/1987 | Conner | F16L 21/08 285/310 |
| 4,718,701 | A | 1/1988 | Vigneron et al. | 285/91 |
| 4,871,197 | A | 10/1989 | Codding, III et al. | 285/231 |
| 5,197,768 | A | 3/1993 | Conner | |
| 2005/0067836 | A1 | 3/2005 | Copeland | |
| 2007/0063511 | A1 | 3/2007 | Copeland | |

FOREIGN PATENT DOCUMENTS

| | | | |
|---|---|---|---|
| JP | S59-126194 A | 7/1984 | |
| JP | 62-237193 A | 10/1987 | ............. F16L 21/08 |
| JP | 02-051789 U1 | 4/1990 | ............. F16L 21/08 |
| JP | 03-177687 A | 8/1991 | ............. F16L 21/08 |
| JP | 2001-173852 A | 6/2001 | ............. F16L 21/08 |
| JP | 2002-071064 A | 3/2002 | |
| JP | 2003-185069 A | 7/2003 | |
| JP | 2007-506925 A | 3/2007 | |
| JP | 2008-025715 A | 2/2008 | ............. F16L 21/08 |
| JP | 2008-039122 A | 2/2008 | ............. F16L 21/08 |
| SE | 465792 | 10/1991 | ............. F16L 21/03 |

* cited by examiner

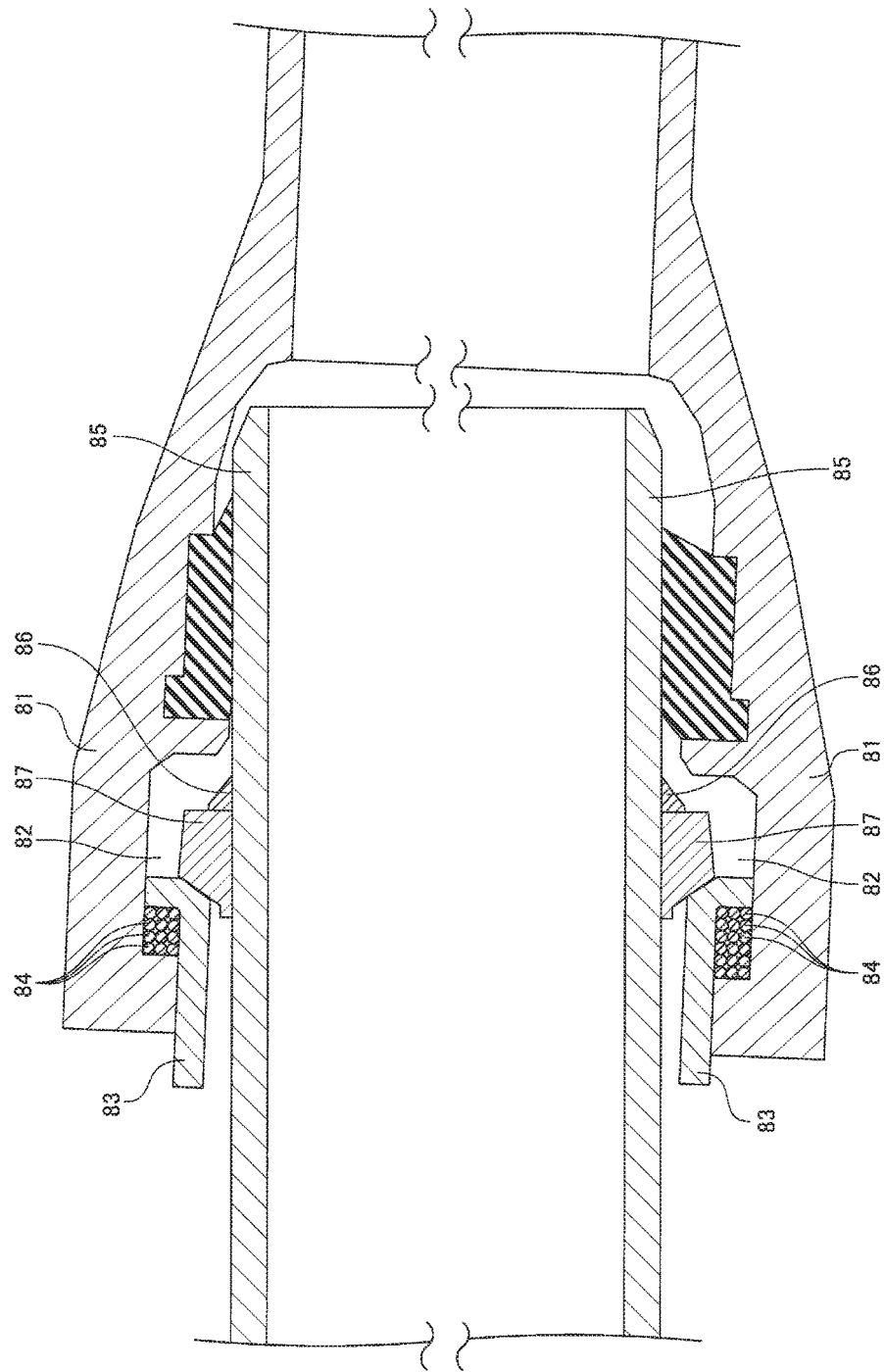

SEPARATION PREVENTIVE PIPE JOINT AND PIPELINE CONSTITUENT MEMBER

FIELD OF THE INVENTION

The present invention relates to a separation preventive pipe joint and a pipeline constituent member.

BACKGROUND OF THE INVENTION

Generally, a plurality of pipes such as ductile cast iron pipes have been connected to constitute a pipeline, for example, a buried pipeline for water supply. If such a pipeline includes a fitting, e.g., a bend, a tee, a reducer, and a plug, an uneven force is applied to a bent portion, a branch portion, or a pipe-diameter changing portion of the fitting (specifically, a point where a water flow direction is changed or a point where the cross-sectional area of a flow channel is changed) so as to move the pipe according to a water pressure in the pipe. A pipe portion in a certain distance range continuing to the point (the bent portion, the branch portion, or the pipe-diameter changing portion of the fitting) is influenced by the uneven force, so as to be moved. Thus, at the joints of fittings, the joints of a fitting and a pipe, and the joints of pipes near the fitting and the pipe, a separation preventive pipe joint is preferably used. The separation preventive pipe joint is configured to deflect pipes at the joint to some extent and has the function of preventing separation between the pipes even under the uneven force.

As shown in FIGS. 3 and 5, such conventional separation preventive pipe joints include metallic annular spigot protrusions 52 and 62 that are formed around the vicinities of the ends of spigots 51 and 61, and metallic lock rings 55 and 65 that are disposed in lock ring storage grooves 54 and 64 formed in sockets 53 and 63. When the spigots 51 and 61 are removed from the sockets 53 and 63, the spigot protrusions 52 and 62 come into contact with the lock rings 55 and 65 from the rears of the sockets 53 and 63, thereby preventing the spigots 51 and 61 from separating from the sockets 53 and 63. Reference numerals 56 and 66 in FIGS. 3 and 5 denote seal members stored in seal member storage grooves 57 and 67 formed in the sockets 53 and 63.

In the conventional separation preventive pipe joint shown in FIG. 3, the metallic lock ring 55 has one slit in its circumference, that is, the lock ring 55 is shaped like a ring having a split at a point in its circumference and is closely fit onto the outer surface of the spigot 51 in the lock ring storage groove 54. In the separation preventive pipe joint shown in FIG. 5, the metallic spigot protrusion 62 considerably protruding in a radial direction is fixed around the end of the spigot 61 with a welded portion 62a. Furthermore, the metallic lock ring 65 having one slit in its circumference is inserted into the lock ring storage groove 64 and is kept with an increased diameter in the lock ring storage groove 64 with a bolt 69 attached to a diameter-increasing auxiliary part 68 from the outside of the socket 63. The separation preventive pipe joint in FIG. 5 is disclosed in U.S. Pat. No. 4,524,505. JP54-106918A discloses a separation preventive pipe joint having a similar structure to that of U.S. Pat. No. 4,524,505.

In the conventional separation preventive pipe joints shown in FIGS. 3 and 5, the lock rings 55 and 65 and the spigot protrusions 52 and 62 are made of non-deformable metallic materials as well as the sockets 53 and 63 and the spigots 51 and 61. If pipes having the separation preventive pipe joints are deflected at the joints of the pipes, as shown in FIGS. 4 and 6, the sockets 53 and 63 and the lock rings 55 and 65 or the lock rings 55 and 65 and the spigot protrusions 52 and 62 come into contact with only a single point in the circumference, that is, in a so-called edge loading state. Thus, in this state, the pipe receives a force applied in a removing direction, e.g., a drawing force generated by a water pressure in the pipe, thereby applying a large stress to the sockets 53 and 63 and the spigots 51 and 61. This may damage the lock rings 55 and 65 and the spigot protrusions 52 and 62 on the contact point or separate the spigot protrusions 52 and 62 from the spigots 51 and 61 so as to remove the spigots 51 and 61 from the sockets 53 and 63. Thus, the conventional separation preventive pipe joints in FIGS. 3 to 6 disadvantageously have a low-level separation preventing function.

JP2008-25715A and JP62-237193A disclose separation preventive pipe joints that can respond to such a low-level separation preventing function. As shown in FIG. 7, in the separation preventive pipe joint disclosed in JP2008-25715A, a socket lock ring 72 and a socket ring 73 are disposed around a socket 71 while a spigot lock ring 75, a spigot protrusion 76 including a weld bead, and a spigot ring 77 are disposed around a spigot 74. The socket ring 73 and the spigot ring 77 are connected via a bolt 78 and a nut 79.

As shown in FIG. 8, even when the separation preventive pipe joint is deflected, the connecting length of the bolt 78 and the nut 79 is adjusted so as to have an adjusted distance between the socket ring 73 and the spigot ring 77. This can satisfactorily bring the socket 71, the socket lock ring 72, and the socket ring 73 into contact with one another over the circumference without edge loading and bring the spigot ring 77, the spigot lock ring 75, and the spigot protrusion 76 into contact with one another over the circumference without edge loading. Thus, even if a drawing force generated by a water pressure is applied to the pipes, separation between the pipes can be satisfactorily prevented. JP57-165883U and U.S. Pat. No. 4,871,197 also disclose separation preventive pipe joints having similar structures.

As shown in FIG. 9, the separation preventive pipe joint disclosed in JP62-237193A includes an annular holder 83 that protrudes into a lock ring storage groove 82 of a socket 81 from the outside of the socket 81 and comes into contact with a lock ring 87. Multiple small iron balls 84 are stored between the holder 83 and the bottom of the lock ring storage groove 82. In FIG. 9, reference numeral 85 denotes a spigot and reference numeral 86 denotes a spigot protrusion. In the separation preventive pipe joint, the holder 83 is disposed in the socket 81 so as to come into contact with the circumference of the lock ring 87, and then a gap between the holder 83 and the bottom of the lock ring storage groove 82 needs to be completely filled with the small iron balls 84.

Also in the separation preventive pipe joint, the gap completely filled with the iron balls 84 brings the holder 83 into contact with the circumference of the lock ring 87. Thus, even if a drawing force generated by a water pressure is applied to pipes so as to deflect the separation preventive pipe joint, as shown in FIG. 10, separation between the pipes can be satisfactorily prevented.

SUMMARY OF INVENTION

Technical Problem

Although the conventional separation preventive pipe joint shown in FIGS. 7 and 8 can obtain a reliable separation preventing function, the separation preventive pipe joint having quite a large number of components requires a lot of time and work when connecting the spigot 74 and the socket 71, leading to poor workability.

The conventional separation preventive pipe joint in FIGS. 9 and 10 has a relatively small number of components but requires a lot of time and work when filling the gap with the multiple iron balls 84. If the angle of deflection of the pipe joint is changed after the filling of the iron balls 84, the holder 83 and the lock ring 87 are placed into an edge loading state, reducing the level of a separation preventing function. Moreover, the filling of the iron balls 84 makes it difficult to adjust the angle of deflection of the pipe joint and disassemble the pipe joint.

The present invention has been devised to solve the problems. An object of the present invention is to provide a separation preventive pipe joint that can obtain an improved separation preventing function, can be assembled (worked) with reduced time and work on site, and has an adjustable angle of deflection.

Solution to Problem

In order to solve the problems, a separation preventive pipe joint of the present invention is a pipe joint including a socket formed on the end of one pipe and a spigot formed on the end of another pipe, the spigot being inserted into the socket, the socket having a lock ring storage groove on the inner periphery of the socket, the lock ring storage groove accommodating a metallic lock ring that can be engaged with a protrusion formed on the outer surface of the spigot, and a cushioning material that comes into contact with the bottom of the lock ring storage groove and the side wall of a socket opening, the cushioning material being made of a material softer than the lock ring.

With this configuration, the cushioning material is made of a material softer than the lock ring. Thus, if a pipe having the socket and a pipe having the spigot are connected in a deflected state, a force is applied in a direction that separates the spigot from the socket. Thus, initially, the cushioning material and the lock ring only partially come into contact with each other in a circumferential direction. However, as a force applied in the separating direction increases, the contact area of the cushioning material with the lock ring is deformed to expand in the circumferential direction, the cushioning material and the lock ring come into contact with each other on the circumference or a portion near the circumference, that is, over a wide area. Hence, even if a force, e.g., a drawing force generated by a water pressure in the pipe is applied to the pipe in the separating direction, separation between the socket and the spigot can be reliably prevented. Moreover, the metallic lock ring and the cushioning material made of a material softer than the lock ring are disposed in the lock ring storage groove with a simple structure. Thus, the separation preventive pipe joint can be assembled (worked) with reduced time and work in a working site where pipes are installed and joined. In a state in which a drawing force generated by a water pressure is not applied to the pipe, the cushioning material is not considerably deformed. This facilitates adjustments of the angle of deflection of the pipe joint in a working site.

Moreover, according to the separation preventive pipe joint of the present invention, the cushioning material is configured such that if a pipe having the socket and a pipe having the spigot are connected in a deflected state, the contact area of the cushioning material with the lock ring is deformed to expand in a circumferential direction according to an increase in force in a direction that separates the spigot from the socket. The cushioning material is preferably made of resin.

Furthermore, according to the separation preventive pipe joint of the present invention, the lock ring has a socket opening side where a surface inclines outward, and the cushioning material has a socket rear side where a surface inclines inward so as to come into contact with the inclined surface of the lock ring.

With this configuration, the application of a force for removing the spigot from the socket brings the inclined surface of the lock ring into contact with the inclined surface of the cushioning material; meanwhile, the reaction force of a force applied to the inclined surface satisfactorily brings the cushioning material into contact with the lock ring storage groove and brings the lock ring into contact with the outer surface of the spigot and presses the lock ring in a direction that comes into contact with the spigot protrusion. This satisfactorily and reliably brings the lock ring into contact with the spigot protrusion, steadily preventing separation between the socket and the spigot.

A pipeline constituent member of the present invention includes the separation preventive pipe joint.

Advantageous Effects of Invention

As described above, according to the present invention, the lock ring storage groove accommodates the metallic lock ring that can be engaged with the spigot protrusion, and the cushioning material that comes into contact with the bottom of the lock ring storage groove and the side wall of the socket opening, the cushioning material being made of a material softer than the lock ring. With this configuration, even if a drawing force generated by a water pressure is applied to a pipe, separation between the socket and the spigot can be reliably prevented, achieving a reliable separation preventing function. Moreover, the metallic lock ring and the cushioning material made of a material softer than the lock ring are disposed in the lock ring storage groove with a simple structure. Thus, the separation preventive pipe joint can be assembled (worked) with reduced time and work in a working site where pipes are installed and joined, achieving high workability and working efficiency. In a state where a drawing force generated by a water pressure is not applied to the pipe, the cushioning material is not considerably deformed. This facilitates adjustments of the angle of deflection of the pipe joint in a working site, achieving high workability.

Moreover, the lock ring has the socket opening side where the surface inclines outward, and the cushioning material has the socket rear side where the surface inclines inward so as to come into contact with the inclined surface of the lock ring. When a force for removing the spigot from the socket is applied to bring the inclined surfaces into contact with each other, the cushioning material comes into contact with the lock ring storage groove with a larger force by the reaction force of a force applied to the inclined surfaces and the lock ring is satisfactorily and reliably brought into contact with the outer surface of the spigot and the spigot protrusion. Consequently, the socket and the spigot can be satisfactorily and reliably engaged with each other via the cushioning material and the lock ring. This can further reliably prevent separation between the socket and the spigot, improving the separation preventing function.

BRIEF DESCRIPTION OF THE DRAWINGS

FIG. 10 is a cross-sectional view showing the principal part of this conventional separation preventive pipe joint in a deflected state.

DETAILED DESCRIPTION OF THE INVENTION

Figure 1:
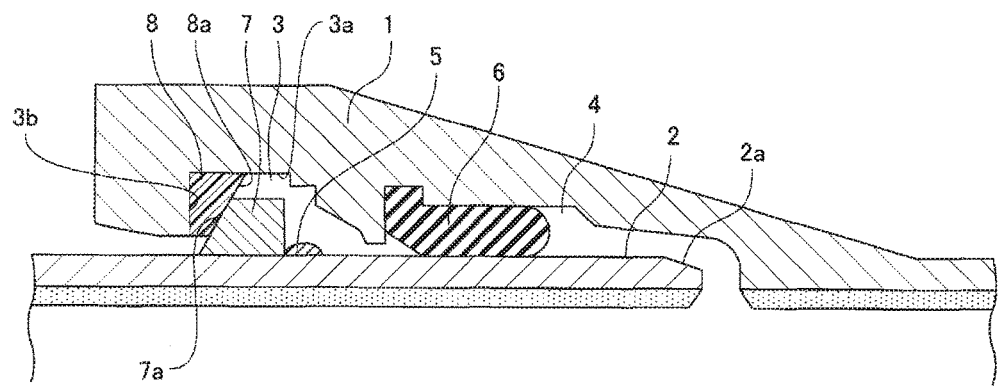
FIG. 1 is a cross-sectional view showing the principal part of a separation preventive pipe joint according to an embodiment of the present invention.

A separation preventive pipe joint according to an embodiment of the present invention will be described below with reference to the accompanying drawings. FIG. 1 is a cross-sectional view showing the principal part of the separation preventive pipe joint according to the embodiment of the present invention.

In FIG. 1, reference numeral 1 denotes a socket formed on the end of one pipe (pipeline constituent member) and reference numeral 2 denotes a spigot formed on the end of another pipe (pipeline constituent member). When these pipes (pipeline components) are connected to each other, as shown in FIG. 1, the spigot 2 is inserted into the socket 1.

On the inner periphery of the socket 1, a lock ring storage groove 3 and a seal member storage groove 4 are formed in this order from the opening of the socket. An annular spigot protrusion 5 is fixed around the spigot 2 by welding or the like. The seal member storage groove 4 formed on the inner periphery of the socket 1 has an annular elastic seal member 6 made of rubber or the like. The lock ring storage groove 3 formed between the opening and the seal member storage groove 4 of the socket 1 has a lock ring 7 having one slit in its circumference and a cushioning material 8 having one slit in its circumference.

Small pieces (not shown) are attached to opposing ends of the one slit of the lock ring 7 in its circumference. Moreover, a cut-out portion is provided at a point on the circumference of the opening end face of the socket 1. The intervals of the small pieces are adjusted from the outside of the socket 1 through the cut-out portion by using, for example, a bolt or a nut (not shown). This can expand or shrink the lock ring 7 disposed in the lock ring storage groove 3 in the socket, in diameter.

Consequently, when the socket 1 and the spigot 2 are joined to each other, the spigot protrusion 5 can pass through the interior of the lock ring 7, which is elastically expanded in diameter by an operation from the outside of the socket, to the rear of the socket 1. After the passage, the lock ring 7 is fit onto the outer periphery of the spigot 2 by an operation from the outside of the socket so as to be engaged from the rear of the socket 1. The annular seal member 6 is compressed between the socket 1 and the spigot 2 so as to seal a clearance between the socket and the spigot. The end rim of the spigot 2 has an inclined surface 2a that tapers toward the end of the spigot 2.

In this configuration, the lock ring 7 stored in the lock ring storage groove 3 is made of a metal and is fit onto the outer periphery of the spigot 2 as has been discussed. The cushioning material 8 stored in the lock ring storage groove 3 is disposed between the opening of the socket and the lock ring 7 so as to be in contact with a bottom 3a of the lock ring storage groove 3 and a side wall 3b of the socket opening. The cushioning material 8 is made of a material softer than the lock ring 7, for example, a resin material such as polyethylene in the present embodiment.

On the socket opening side of the lock ring 7, an inclined surface 7a is formed so as to incline outward, that is, the inner side of the inclined surface 7a is radially inclined toward the opening of the socket. Accordingly, on the socket rear side of the cushioning material 8, an inclined surface 8a is formed so as to incline inward, that is, the outer side of the inclined surface 8a is radially inclined toward the rear of the socket. As shown in FIG. 1, the inclined surface 7a of the lock ring 7 and the inclined surface 8a of the cushioning material 8, specifically, an inner portion on the inclined surface 7a of the lock ring 7 and an outer portion on the inclined surface 8a of the cushioning material 8 can be brought into contact with each other in an inclined position. As shown in FIG. 1, the lock ring 7 set in the lock ring storage groove 3 does not directly come into contact with the socket 1.

Figure 2:
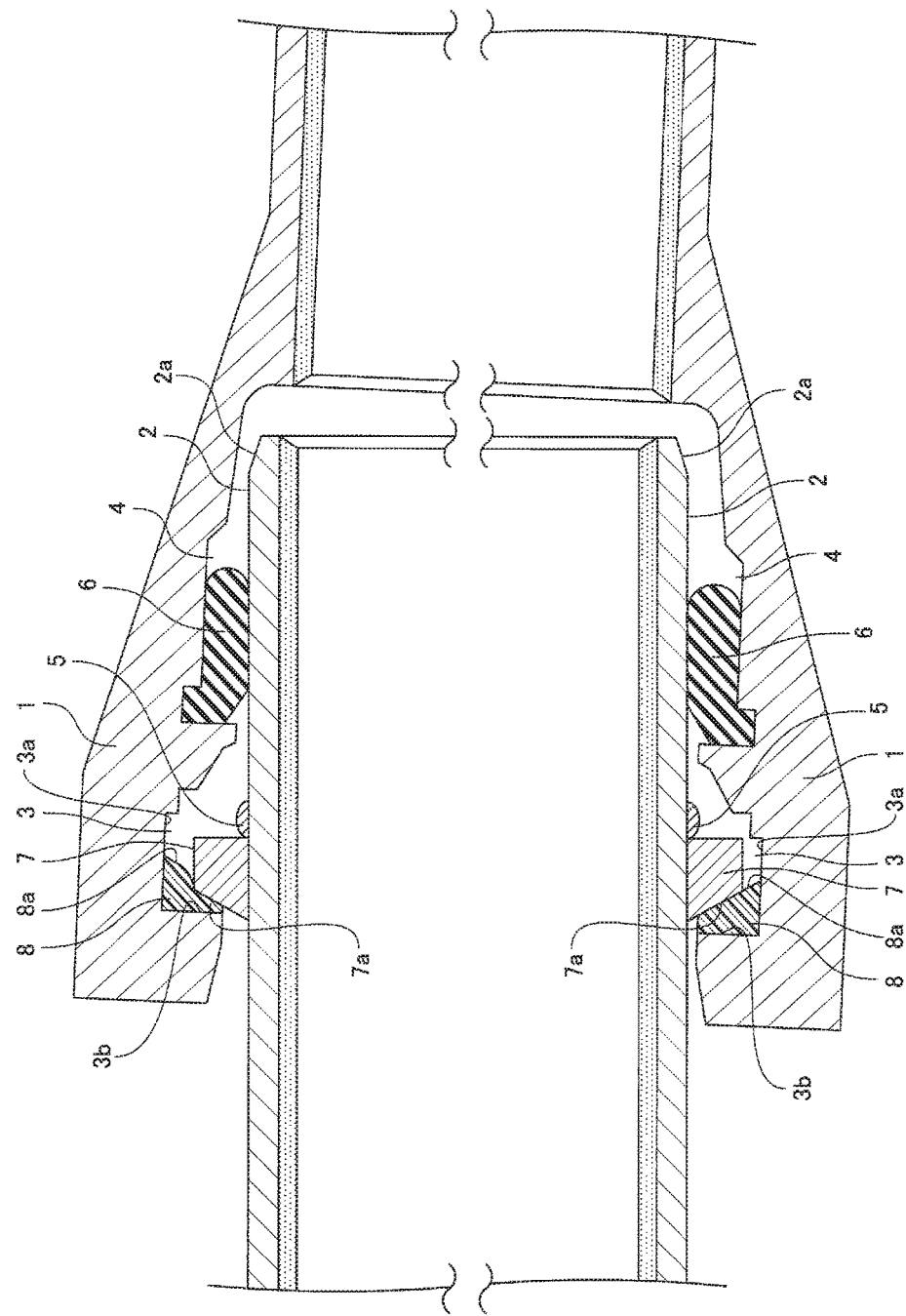
FIG. 2 is a cross-sectional view showing the principal part of the separation preventive pipe joint in a deflected state according to the embodiment of the present invention.
Figure 3:
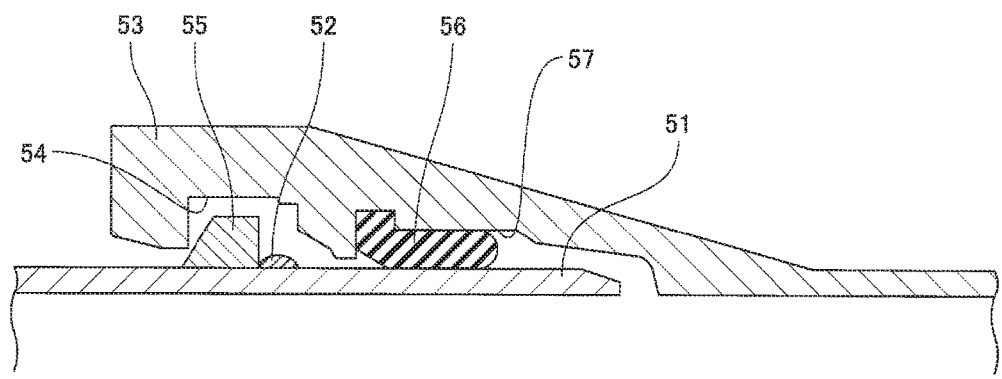
FIG. 3 is a cross-sectional view showing the principal part of a conventional separation preventive pipe joint.
Figure 4:
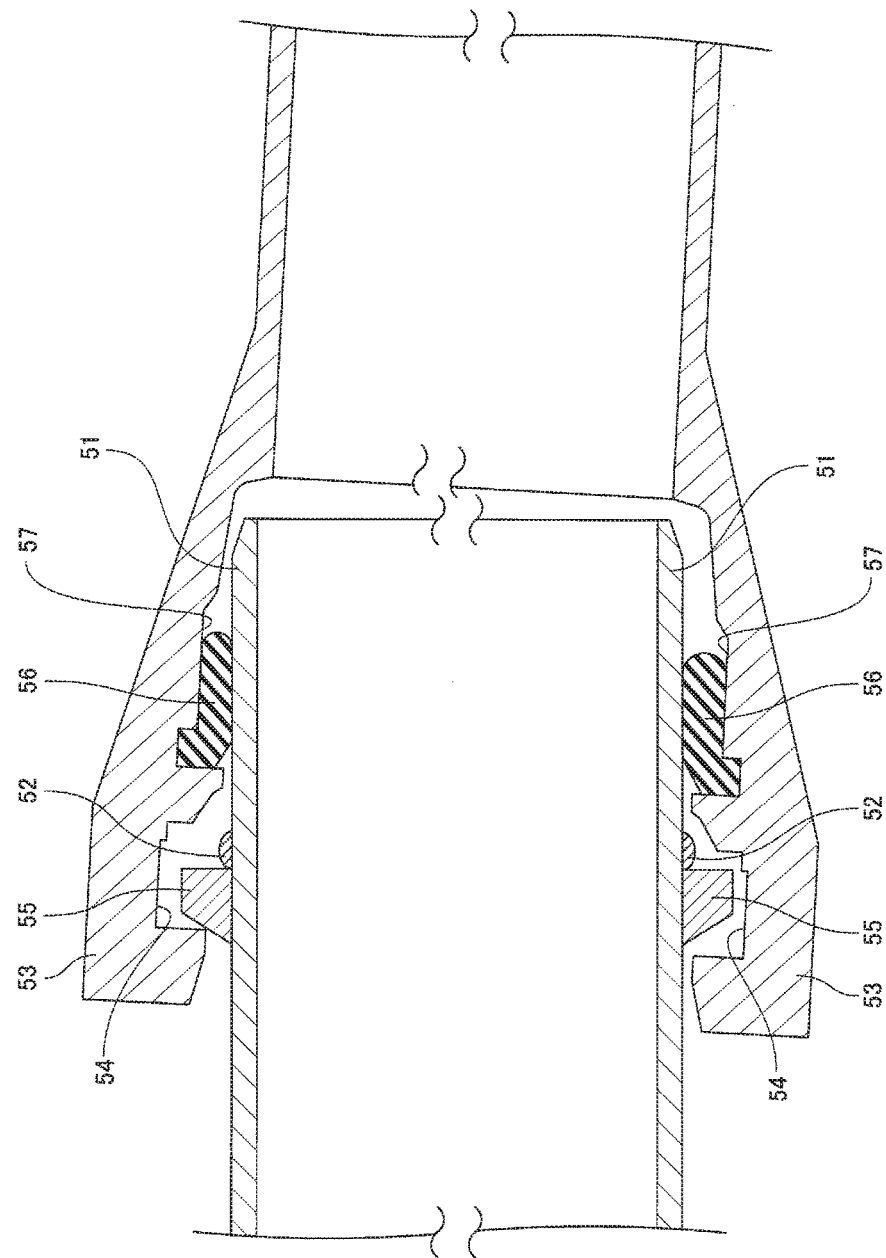
FIG. 4 is a cross-sectional view showing the principal part of the conventional separation preventive pipe joint in a deflected state.
Figure 5:
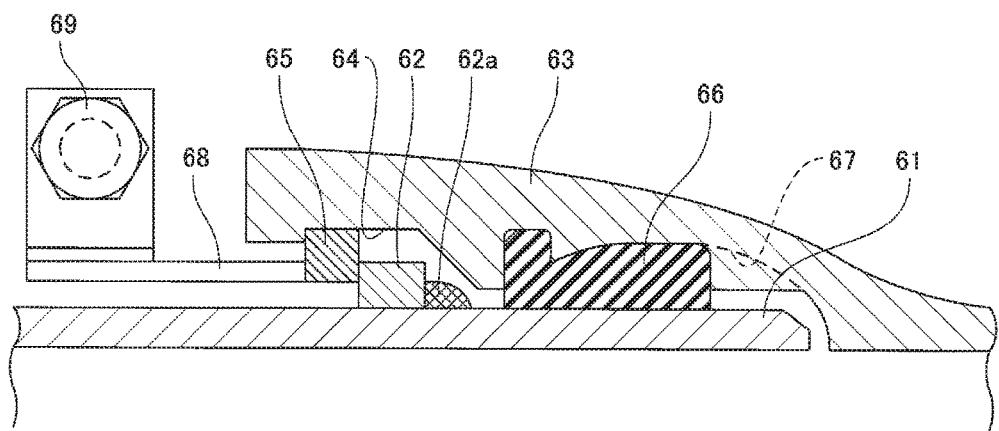
FIG. 5 is a cross-sectional view showing the principal part of another conventional separation preventive pipe joint.
Figure 6:
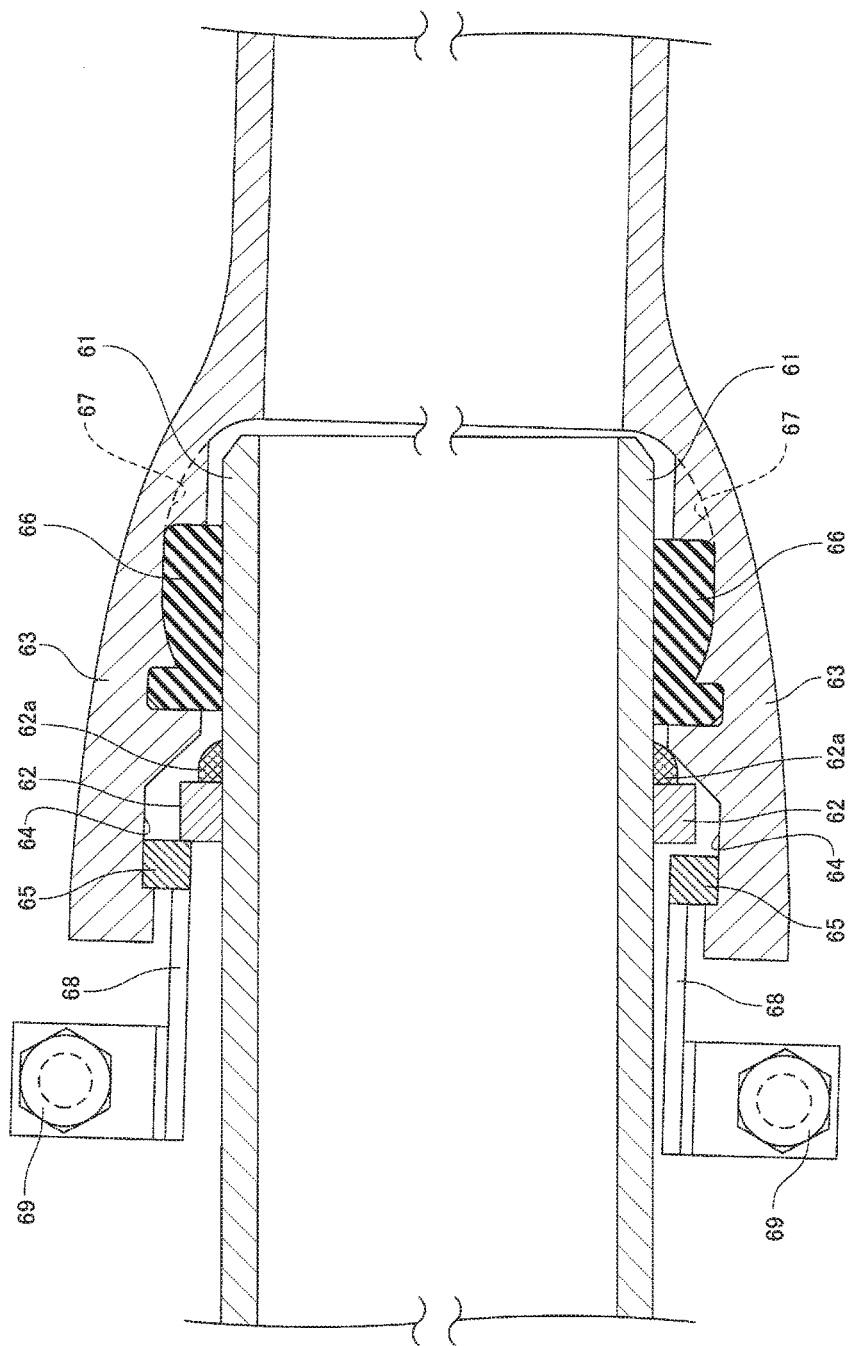
FIG. 6 is a cross-sectional view showing the principal part of this conventional separation preventive pipe joint in a deflected state.
Figure 7:
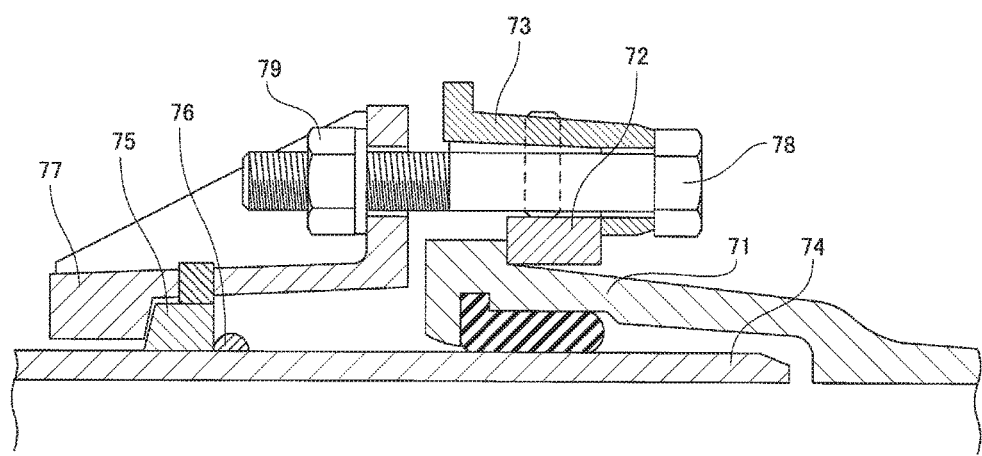
FIG. 7 is a cross-sectional view showing the principal part of still another conventional separation preventive pipe joint.
Figure 8:
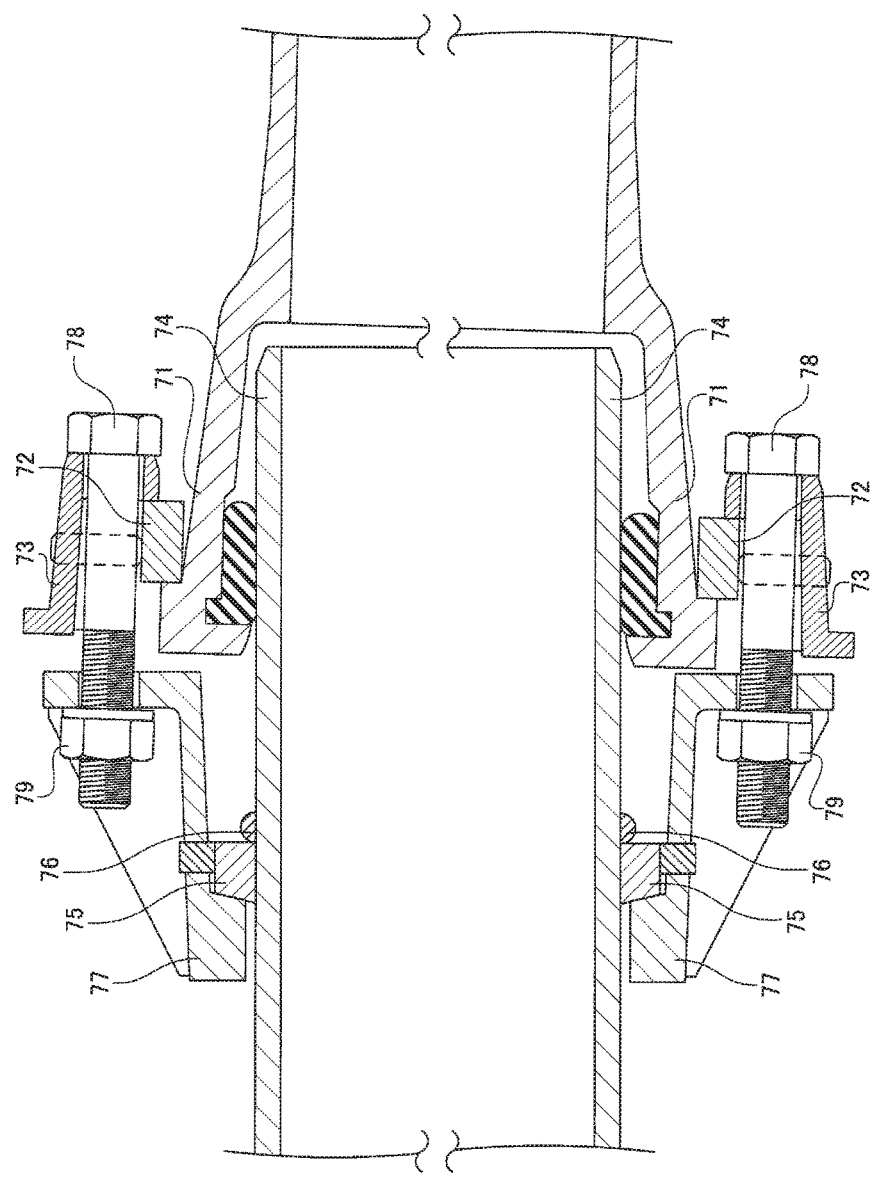
FIG. 8 is a cross-sectional view showing the principal part of this conventional separation preventive pipe joint in a deflected state.
Figure 9:
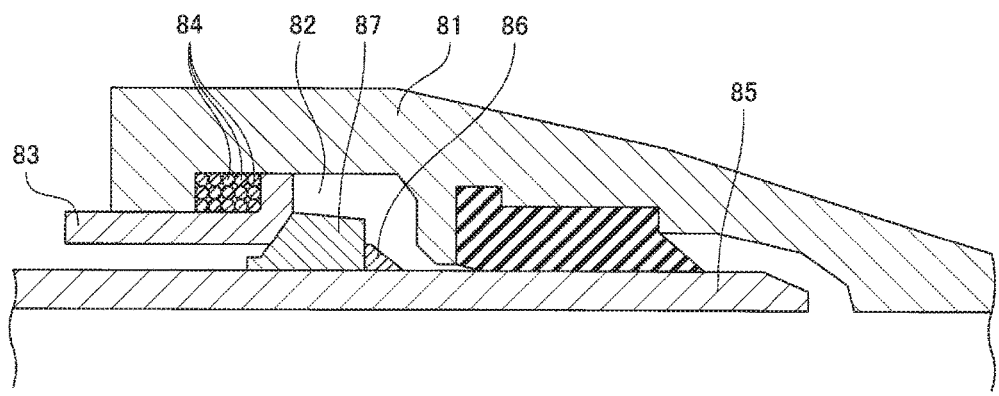
FIG. 9 is a cross-sectional view showing the principal part of yet another conventional separation preventive pipe joint.

As has been discussed, the lock ring storage groove 3 accommodates the metallic lock ring 7 that can be engaged with the spigot protrusion 5 and the cushioning material 8 that comes into contact with the bottom 3a of the lock ring storage groove 3 and the side wall 3b on the socket opening side. The cushioning material 8 is made of a material such as resin softer than the lock ring 7. With this configuration, in the case of connection in a deflected state, for example, at a point where at least one of a pipe having the socket 1 and a pipe having the spigot 2 is a fitting, e.g., a bend or a tee or at a junction between pipes in a certain distance range continuing to the point, a force is applied in this state in a direction that separates the spigot 2 from the socket 1 in response to an uneven force generated by a water pressure in the pipe so as to move the pipe. Thus, initially, the cushioning material 8 and the lock ring 7 (specifically, the inclined surface 8a of the cushioning material 8 and the inclined surface 7a of the lock ring 7) only partially (an inner portion in the deflected state) come into contact with each other in a circumferential direction, that is, in a so-called edge loading state. However, as a force applied in the separating direction increases, the contact area of the cushioning material 8 with the lock ring 7 is deformed to expand in the circumferential direction, and then as shown in FIG. 2, the cushioning material 8 and the lock ring 7 come into contact with each other on the circumference or a portion near the circumference, that is, over a wide area. Hence, even if a large force, e.g., a drawing force generated by a water pressure in the pipe is applied to the pipe in a removing direction, the cushioning material 8 in contact with the socket 1 and the lock ring 7 in contact with the spigot protrusion are satisfactorily brought into contact with each other without being placed into an edge loading state.

This can reliably prevent separation between the socket 1 and the spigot 2, achieving a reliable separation preventing function.

Moreover, the metallic lock ring 7 and the cushioning material 8 made of a material softer than the lock ring 7 are disposed in the lock ring storage groove 3 with a simple structure. Thus, the separation preventive pipe joint can be assembled (worked) with reduced time and work in a working site where pipes are installed and joined, achieving high workability and working efficiency.

In an initial state where a drawing force generated by a water pressure in the pipe is not applied to the pipe, the cushioning material 8 is not considerably deformed and is only partially in contact with the lock ring 7 in the circumferential direction. This facilitates adjustments of the angle of deflection of the pipe joint in a working site, achieving high workability. Moreover, the cushioning material 8 in the initial state is not considerably deformed and is only partially in contact with or is separated from the lock ring 7 in the circumferential direction. Thus, the steps of connecting the pipes are reversed to advantageously disassemble the pipe joint with relative ease.

Furthermore, in this configuration, the socket opening side of the lock ring 7 has the inclined surface 7a that inclines outward while the socket rear side of the cushioning material 8 has the inclined surface 8a that inclines inward so as to come into contact with the inclined surface 7a of the lock ring 7. Thus, the application of a force for removing the spigot 2 from the socket 1 satisfactorily brings the cushioning material 8 and the lock ring 7 into contact with each other. Furthermore, the reaction force of a force applied to the inclined surfaces 7a and 8a brings the cushioning material 8 into contact with the lock ring storage groove 3 with a stronger force and satisfactorily and reliably brings the lock ring 7 into contact with the outer surface of the spigot 2 and the spigot protrusion 5. Consequently, the socket 1 and the spigot 2 can be satisfactorily and reliably engaged with each other via the cushioning material 8 and the lock ring 7. This can prevent the separation with higher reliability, further improving the separation preventing function.

In the present embodiment, the cushioning material 8 is made of resin. The material of the cushioning material 8 is not limited to resin. It is needless to say that the cushioning material 8 may be any material softer than the metallic lock ring 7 and thus may be materials other than resin.

Having described the invention, the following is claimed:

1. A separation preventive pipe joint comprising:
    a socket formed on an end of a first pipeline constituent member; and
    a spigot formed on an end of a second pipeline constituent member, the spigot being inserted into the socket,
    wherein the socket has a lock ring storage groove on an inner periphery of the socket, the lock ring storage groove accommodating (i) a metallic lock ring engageable with a protrusion formed on an outer surface of the spigot, and (ii) a cushioning material that comes into contact with a radially-inward directed lock ring-facing bottom of the lock ring storage groove and a side wall of a socket opening, the cushioning material being made of a material softer than the lock ring, wherein an empty space is formed between a radially-outward directed socket-facing surface of the lock ring and the bottom of the lock ring storage groove, wherein the cushioning material is configured such that when the first pipeline constituent member and the second pipeline constituent member are connected in a deflected state, a contact area of the cushioning material with the lock ring is deformed to expand in a circumferential direction according to an increase in force in a direction that separates the spigot from the socket.

2. The separation preventive pipe joint according to claim 1, wherein the cushioning material is made of resin.

3. The separation preventive pipe joint according to claim 1, wherein the lock ring has a socket opening side where a surface inclines outward, and the cushioning material has a socket rear side where a surface inclines inward so as to come into contact with the inclined surface of the lock ring.

4. The separation preventive pipe joint according to claim 1, wherein the cushioning material is polyethylene.

\* \* \* \* \*